C. O. GARDINER.
CENTERING AND SQUARING DEVICE.
No. 60,169. Patented Dec. 4, 1866.
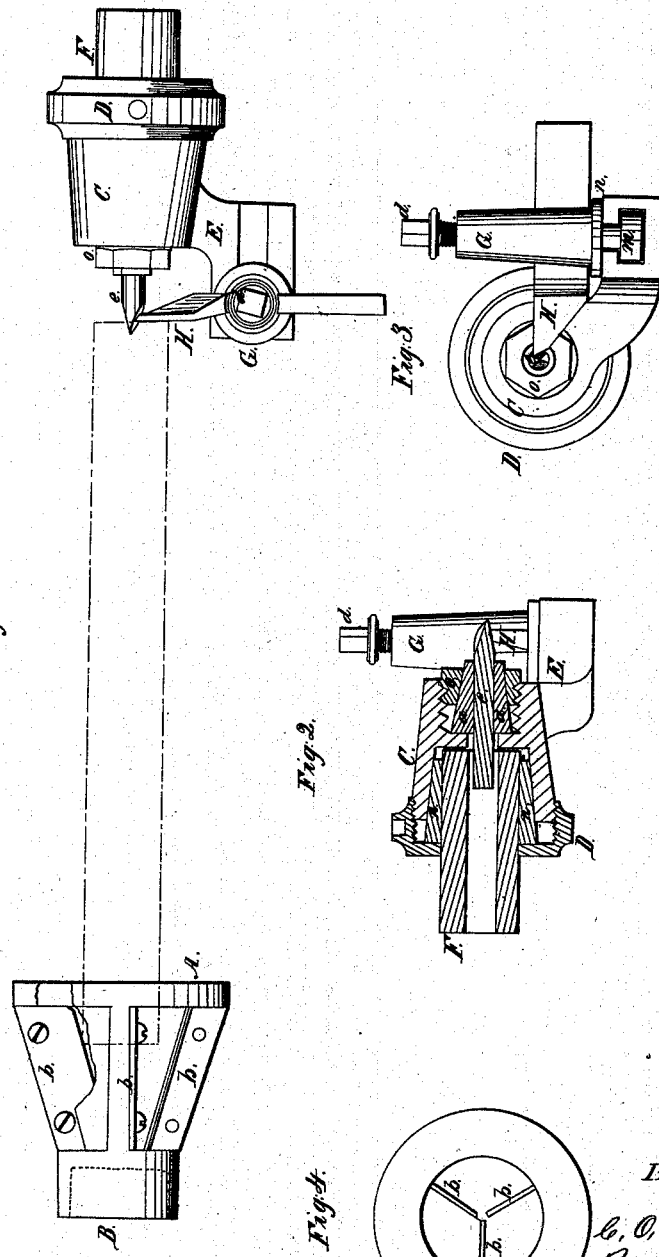

United States Patent Office.

IMPROVEMENT IN CENTERING AND SQUARING DEVICES.

CHARLES O. GARDINER, OF SPRINGFIELD, OHIO.

Letters Patent No. 60,169, dated December 4, 1866.

SPECIFICATION.

TO ALL WHOM IT MAY CONCERN:

Be it known that I, C. O. GARDINER, of Springfield, in the county of Clark, and State of Ohio, have invented certain new and useful Improvements in Tools for Turning, &c.; and I do hereby declare that the following is a full, clear, and exact description thereof, reference being had to the accompanying drawings, making part of this specification, and to the letters of reference marked thereon—like letters indicating like parts, wherever they occur. To enable others skilled in the art to construct and use the invention, I will proceed to describe it.

My invention has for its object, the centering and squaring of the ends of metal rods by means of tools specially adapted to that purpose.

Figure 1 is a top plan view of the tools in position ready for use.

Figure 2 is a longitudinal section of the centering and squaring tool; and

Figure 3 is an end view of the same.

Figure 4 is an end view of the chuck for holding the article to be operated upon.

In the manufacture of many kinds of articles, it is necessary to use and consequently to make a large number of metal rods or spindles of uniform length and size; all of which have also to be centred, preparatory to placing in the lathe for turning.

To accomplish these objects I first provide a self-centering chuck, consisting of a hollow conical body, A, provided with three steel blades, b, inserted through longitudinal slots in its sides as shown in figs. 1 and 4; the blades protruding slightly from the inner face of the cap, A. This chuck is provided with a socket, B, for screwing it fast to the lathe. It will be seen that when a rod has its end inserted in the cavity of the body, A, it will at once assume a central position therein, owing to the inclination of its inner surface, and the blades, b, will seize upon and hold the rod so as to cause it to revolve with the chuck. At the opposite end, secured to the tail block of the lathe, is mounted the centering and squaring tool. This tool consists of a circular body, C, having a curved arm, E, projecting from one side, as shown in figs. 1, 2, and 3. This body, C, has a hole drilled through it longitudinally at the centre as shown in fig. 2, in which is inserted the centre drill, e. This drill is centred perfectly by means of three conical pieces, a, which are inserted around it, in a cavity formed in the front end of C, where they are held, pressed firmly upon the drill, e, by means of the hollow nut, O, which is screwed into the cavity at the front end of C, the hole in the nut, O, being made conical, and embracing the wedges or jaws, a, as shown clearly in fig. 2. A tubular stem, F, is inserted in the rear end of C, and is centred and secured by three conical or wedged-shaped pieces, n, which are also pressed in and held firmly in position by means of the cap, D, screwed on to the rear end of C, as shown in fig. 2. This stem, F, serves to secure the tool in proper position to the tail block of the lathe. The arm, E, after projecting a short distance from the body, C, is extended beyond the front end of C, and parallel therewith, as shown in fig. 1. On the upper face of this arm, E, a groove is formed as shown in fig. 1, which groove is made wider below as shown in fig. 3. A standard, G, is provided, having a head, m, fitted to slide in this groove as shown in fig. 3; and a horizontal mortise is made through the standard, of proper size to receive the chisel, H, which rests upon a ring, n, dropped loosely over the standard, G, and resting on the arm, E. A screw, d, is inserted in the upper end of the standard, G, and extends down to and presses on the chisel, H, thus serving to hold the chisel firmly in the standard, and at the same time securing the standard, G, firmly to the arm, E. By loosening the screw, d, the chisel may be adjusted as desired in the standard, and the standard itself also adjusted backward or forward on the arm, E, as circumstances may require. It will be observed that the centre, e, is formed into drill at its point, so that as the rod revolves, it gradually drills its way into the end of the rod; and the chisel being placed at right angles to the rod and having its end brought close up against the drill, will at the same time turn off the end of the rod perfectly true and flat. As the chisel can be set at any desired angle, it is obvious that it may be made to cut the end of the rod tapering or convex, at will, if desired.

To use my improved tools, it is only necessary to attach them to the lathe as described, insert the rods, and finish one end; then turn them and complete the other end in a similar manner. In order to centre the rod readily I use a crotch rest, the notch in which is made of the proper size to bring the end of the rod to the proper position in relation to the drill, e.

Having thus described my invention, what I claim, is—

1. The chuck C, provided with the conical sectional rings or wedges *a*, and nut O, for centering and holding the drill *e*, as shown and described.

2. The sectional rings *n*, and cap D, in combination with the chuck C, and spindle F, arranged and operating as shown and described.

3. I claim the grooved arm E, attached to the body C, and provided with the standard G, for holding the chisel H, when arranged to operate in connection with the other parts, as set forth.

4. The hollow conical chuck A, in combination with the detachable blades or jaws *b*, all constructed and arranged as and for the purpose set forth.

CHARLES O. GARDINER.

Signed in presence of—
GEO. ARTHUR,
GEO. SPENCE.